United States Patent [19]

DiPietro et al.

[11] Patent Number: 5,779,919

[45] Date of Patent: Jul. 14, 1998

[54] PORCELAIN ENAMEL SIGN AND METHOD OF MANUFACTURE

[75] Inventors: Milton DiPietro, North Brunswick, N.J.; Donall B. Healy, New York, N.Y.

[73] Assignee: New York Sign Systems, Inc., New York, N.Y.

[21] Appl. No.: 584,007

[22] Filed: Jan. 11, 1996

[51] Int. Cl.[6] .............................................. B44C 1/22
[52] U.S. Cl. ................... 216/4; 216/100; 40/615
[58] Field of Search .................. 216/4, 100; 40/616, 40/615; 428/164

[56] References Cited

U.S. PATENT DOCUMENTS

| | | |
|---|---|---|
| 1,559,572 | 11/1925 | Kapner .................... 40/616 |
| 2,963,805 | 12/1960 | Sterry ..................... 216/4 |
| 4,117,616 | 10/1978 | Penton .................... 40/550 |
| 4,429,478 | 2/1984 | Bruce-Sanders ........... 40/447 |
| 4,844,391 | 7/1989 | Follis ..................... 248/121 |
| 5,336,458 | 8/1994 | Hutchison et al. ......... 264/220 |

*Primary Examiner*—R. Bruce Breneman
*Assistant Examiner*—Michael E. Adjodha
*Attorney, Agent, or Firm*—Darby & Darby

[57] ABSTRACT

A porcelain coated sign comprises a steel plate reverse etched to form raised indicia, including Braille, against an etched background area. The plate is coated with a porcelain slurry and fired to form a porcelainized surface. The raised indicia may be tipped with one or more additional pigmented porcelain enamels to provide contrasting colors if desired.

8 Claims, 1 Drawing Sheet

1

PORCELAIN ENAMEL SIGN AND METHOD OF MANUFACTURE

FIELD OF THE INVENTION

This invention generally relates to signs and more particularly to signs having a porcelain enamel surface with raised indica.

BACKGROUND OF THE INVENTION

The Americans with Disabilities Act ("ADA") has mandated that signs which are to be utilized for "permanent room identification" are to have upper case lettering which is to be raised at least 1/32 inch from the background of the sign. Further required by the ADA is the use of Grade II Braille on "permanent room identification" signs which is also to be raised at least 1/32 inch from the background of the sign.

The majority of signs currently utilized for "permanent room identification" do not satisfy the ADA requirements. For example, many of the signs implemented since the early 1970's have images which were incised into the background of the sign or subsurface imprinted. Many such signs for institutional settings were porcelain enameled which proved advantageous because of their resistance to both weathering and vandalism.

In response to the ADA's sign requirements, the majority of ADA compliant signs are currently manufactured through photopolymer printing plate technology. Such photopolymer printing plate technology utilizes a substrate plate having a thick photosensitive emulsion which is photographically imaged with a film negative. The unexposed portion of the plate is then washed away with water and the exposed photopolymer emulsion portion of the plate, hardened by light, is then raised from the unexposed portion of the plate. The plate having the resulting raised image (e.g. lettering or Braille) is then painted with a background color. The painting step is usually performed after the plate is laminated with a relatively thick substrate, such as 1/8" acrylic. Finally, the raised image is "tipped" (coating the raised image with a contrasting colored ink applied by either hot stamping or flood screening the raised image). The Braille portion of the plate is usually not "tipped".

Other known methods for manufacturing signs in compliance with the ADA requirements includes fabricating signs though a process known as "reverse etching". Reverse etching relates to etching a specified portion of a metal plate such that a desired image (e.g. letters and/or Braille) appears raised from the etched portion of the metal plate. Thus, the etched portion of the metal plate forms the background portion of the sign.

In furtherance of the ADA requirements, many current signs utilized for "permanent room identification" require surface painting and "tipping", as discussed above. In regards to the majority of etched metal signs, the background of the sign is painted while the top surface portion of the raised lettering is typically belt sanded such that the exposed metal reads as the typeface color. However, regardless of whether a sign has been surface painted and tipped or belt sanded, in both methods the exposed paint and ink of these signs are susceptible to weathering and acts of vandalism due to its unprotected exposure. Thus, a need exists to produce a sign which is resistant to weathering and vandalism.

One known method which produces a sign which is resistant to the weathering and vandalism is to utilize porcelain enameled signs. Such signs are fabricated by "firing" a porcelain slurry onto a steel plate. "Firing" refers to the method of fusing the porcelain slurry to a metal plate so as to form a hardened porcelain surface on the metal plate. However, there currently does not exist a method of fabricating a porcelain surfaced sign which complies with ADA requirements (having lettering and Braille raised 1/32 inch above the background of the sign).

Thus, it is an object of the present invention to provide a porcelain surfaced sign which complies with ADA requirements.

SUMMARY OF THE INVENTION

The present invention provides a porcelain surfaced sign having raised indicia. The sign includes a steel plate having integrally formed raised indicia which may include Braille. The indicia are formed by reverse etching the steel to raise the indicia from the etched background areas of the sign. A layer of porcelain enamel is deposited on the entire surface of the steel plate, including the raised indicia which are dimensioned to comply with ADA requirements for signs utilized for "permanent room identification".

The method of fabricating a porcelain enamel sign according to the invention includes depositing a layer of acid resist on the indica portions of a steel plate. An acid etch is then applied to the plate for a predetermined time period at a temperature sufficient to enable the acid to etch unprotected (background) areas of the plate to a predetermined depth so as to form the raised indicia. A porcelain slurry is then evenly deposited on the metal plate and the sign fired so as to form a hardened porcelain surface having raised indicia.

BRIEF DESCRIPTION OF THE DRAWINGS

Further features of the present invention will become readily apparent from the following detailed description of the invention taken in conjunction with the accompanying drawings, in which.

DETAILED DESCRIPTION OF THE PREFERRED EMBODIMENT

Figure 1:
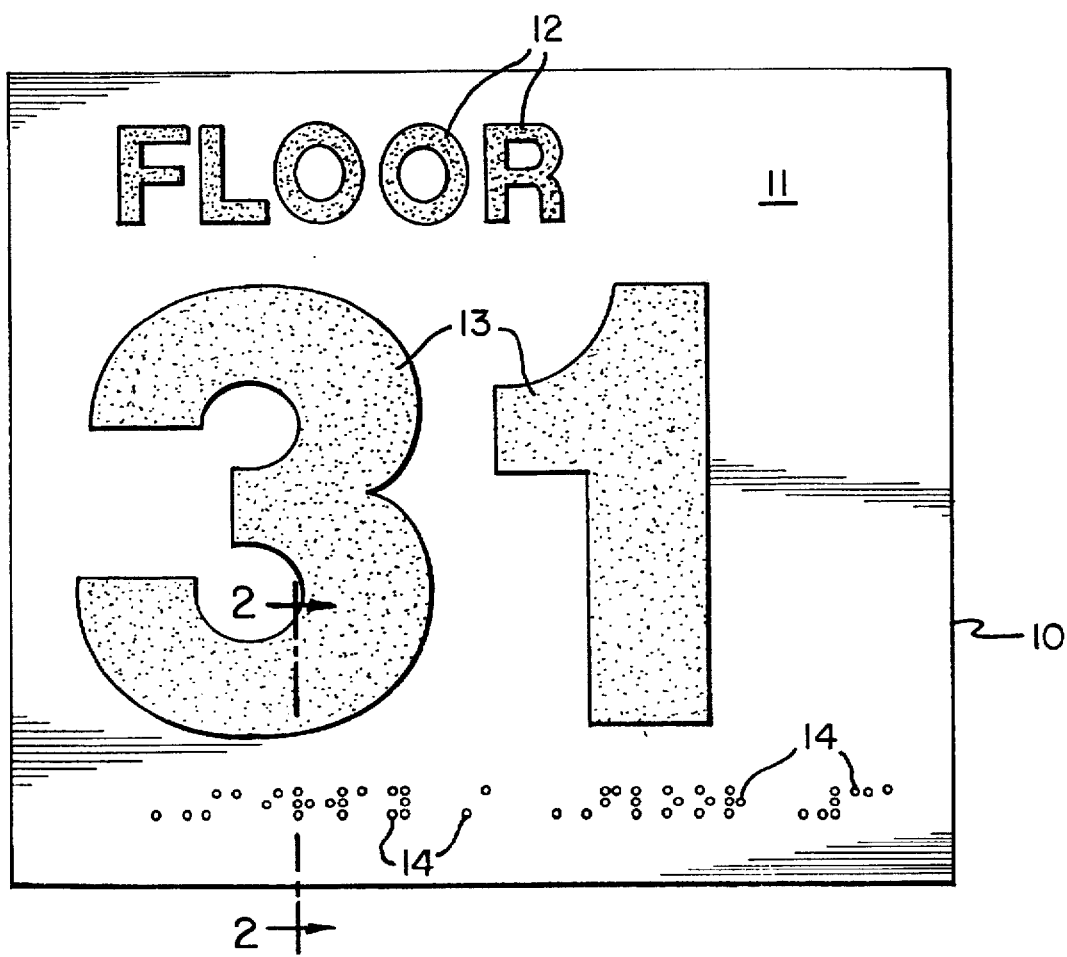
FIG. 1 is a top plan view of a sign illustrating a representative embodiment of the invention.
Figure 2:
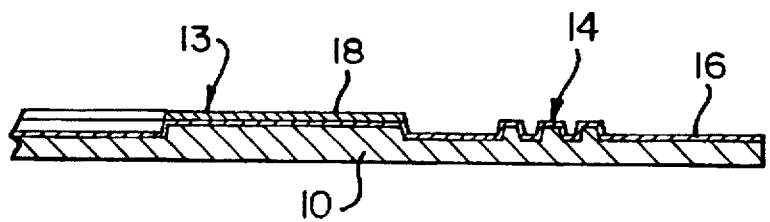
FIG. 2 is a sectional view looking in the direction of the arrows 2—2 in FIG. 1.

In accordance with applicant's invention, a steel plate 10 is reverse-etched to form indicia which are raised from a background region 11. As shown in FIG. 1, the indicia may comprise letters 12, numerals 13 and conventional Braille dots 14. As a result of the reverse-etching process described below, each of the indicia is preferably raised at least 1/32 inches from the background area of the sign. As used herein, "reverse etching" means to etch away the background area(s), leaving the raised indicia.

The material used for plate 10 must be able to withstand the high temperatures used in porcelainizing. Although different types of steel can be used, in the preferred embodiment conventional enamelling steel is used. Such steel is specially formulated for use in a porcelainizing process and tends to produce a relatively unpitted surface after it has been porcelainized.

The thickness of the steel plate 10 is an important feature of the invention. As mentioned above, in order to comply with the ADA, the indicia must be raised at least 1/32 inches from the background of the sign. While it is generally preferable for purposes of economy to use as thin a plate as possible, it has been discovered that if the thickness of the plate (before etching) is less than about 3/32 inches the differential in the rate of temperature change (during heating and cooling) will cause the thin portions of the sign to buckle. For example, if the plate is 1/16 inches thick and etched to a depth of 1/32 inches, the background portion of the plate will only be 1/32 inches thick or one-half the thickness of the indicia portions. This differential may result in buckling of the background areas. If the steel plate is 1/8 (4/32) inches thick a 1/32 differential in thickness after reverse etching (i.e. a background area 3/32 inches thick) will not result in buckling during the heating and cooling cycles of the porcelainizing process. Experiments have indicated that for ADA compliance, a minimum steel plate thickness of about 3/32 inches is acceptable.

The specific process for reverse-etching the steel plate 10 to form the raised indicia may be conventional. In the preferred embodiment, the resist used is an epoxy acid resist manufactured by Union Ink. The resist may be applied to the plate 10 using conventional screen printing techniques. The dark regions in FIG. 1 conforming to the indicia are the regions to which the resist is applied. The epoxy acid resist is then baked on plate 10 for approximately fifteen minutes at about 300° F. The plate, with the coating of resist, is then placed in an acid etch bath, for example ferric chloride acid, at a temperature of about 110°–125° F. for about twenty to thirty minutes. During this time period, the acid is agitated, etching the unprotected steel to a depth of about 1/32 inches. The epoxy acid resist is then removed from the plate, for example using conventional paint stripper.

The steel plate containing the raised indicia is porcelainized in the same way as flat steel using a standard porcelain "frit". Preferably, the plate is lightly sand blasted and a conventional ground coat containing porcelain beads applied to both sides as a primer. The plate then is fired (heated) to a temperature of approximately 1400° F. A cover coat containing a pigment and porcelain beads is then evenly applied to the entire face and sides of the sign and the plate again fired so as to form a layer of porcelain enamel 16 covering the raised indicia as well as the background areas. Care must be taken not to over-bake the plaque which may cause the porcelain to "droop" around the raised indicia. The light sandblasting before priming has been found to help maintain the porcelain enamel on the sides of the indicia during the porcelainizing process.

After the initial porcelainizing procedure, the raised indicia may be "tipped" in one or more porcelainizing processes with different pigmented slurries to form additional porcelain layers 18 of contrasting colors. Photoluminescent porcelain may be used for the indicia and/or the background area.

When the sign is to be fabricated in compliance with the ADA requirements, its indicia must be raised at least 1/32 inch from the background area of the sign. This 1/32 inch background depth is obtained by controlling the etching time in the above discussed reverse etching process. When forming Grade II Braille which is compliant with ADA requirements, the Braille dots are to be 1 mm in diameter and spaced approximately 1 mm from one another. In order to form 1 mm Braille, the dots must be masked with epoxy acid resist to a larger diameter, for example a diameter of approximately 2 mm.

This is because as plate 10 is reverse etched, the diameter of each Braille dot becomes conically shaped during the etching process which means that the "top" decreases in diameter. By increasing the diameter of the mask for each dot, and by controlling the etching time, the diameter for each Braille dot, as well as the spacing between the dots can be controlled. Further, to comply with ADA requirements, each Braille dot should be formed by the reverse etching procedure to have a diameter which is less than 1 mm, since the diameter of each Braille dot is increased by the subsequent layering of porcelain enamel.

Although the present invention has been described with emphasis on a particular embodiment and method of fabrication for a porcelain enamel sign having raised indicia, it should be understood that the figures and processes are for illustrations of exemplary embodiments of the present invention only and should not be taken as limitations or thought to be the only means of carrying out the present invention. Further, it is contemplated that many changes and modifications may be made to the present invention without departing from the spirit and scope of the invention as disclosed above.

What is claimed is:

1. A method of manufacturing a vandal-resistant sign having raised indicia extending from a background area, comprising the steps of:

reverse-etching selected indicia on a surface of said steel plate to form said raised indicia and background area; and baking a porcelain enamel coating onto the raised indicia and background area of the metal plate.

2. A method of manufacturing a vandal-resistant sign according to claim 1, wherein said indicia formed by reverse-etching include Braille dots.

3. A method of manufacturing a vandal-resistant sign according to claim 2, wherein said indicia are formed by applying a resist to the steel plate to mask the indicia, and etching the areas between the indicia to form the background area such that the indicia are raised at least 1/32 inches above the background area; and wherein said Braille dots are formed by masking a circular area substantially larger than the desired area of each Braille dot in the finished sign.

4. A method of manufacturing a vandal-resistant sign according to claim 3, wherein said steel plate is at least about 3/32 inches thick.

5. A method of manufacturing a vandal-resistant sign according to claim 4, further including the step of coating the indicia only with a second porcelain slurry and firing the sign to form a porcelainized coating on the indicia which contrasts in color with the porcelainized coating on the background area of the sign.

6. A method of manufacturing a vandal-resistant sign according to claim 1, wherein said steel plate is at least about 3/32 inches thick.

7. A method of manufacturing a vandal-resistant sign according to claim 1, further including the step of coating the indicia only with a second porcelain slurry and firing the sign to form a porcelainized coating on the indicia which contrasts in color with the porcelainized coating on the background area of the sign.

8. A method of manufacturing a vandal-resistant sign according to claim 1, including the step of lightly abrading at least the raised indicia before applying the porcelain enamel coating to them.

* * * * *